E. A. DEXTER & J. CHASE.
CHAIR.
No. 10,754. Reissued Aug. 10, 1886.
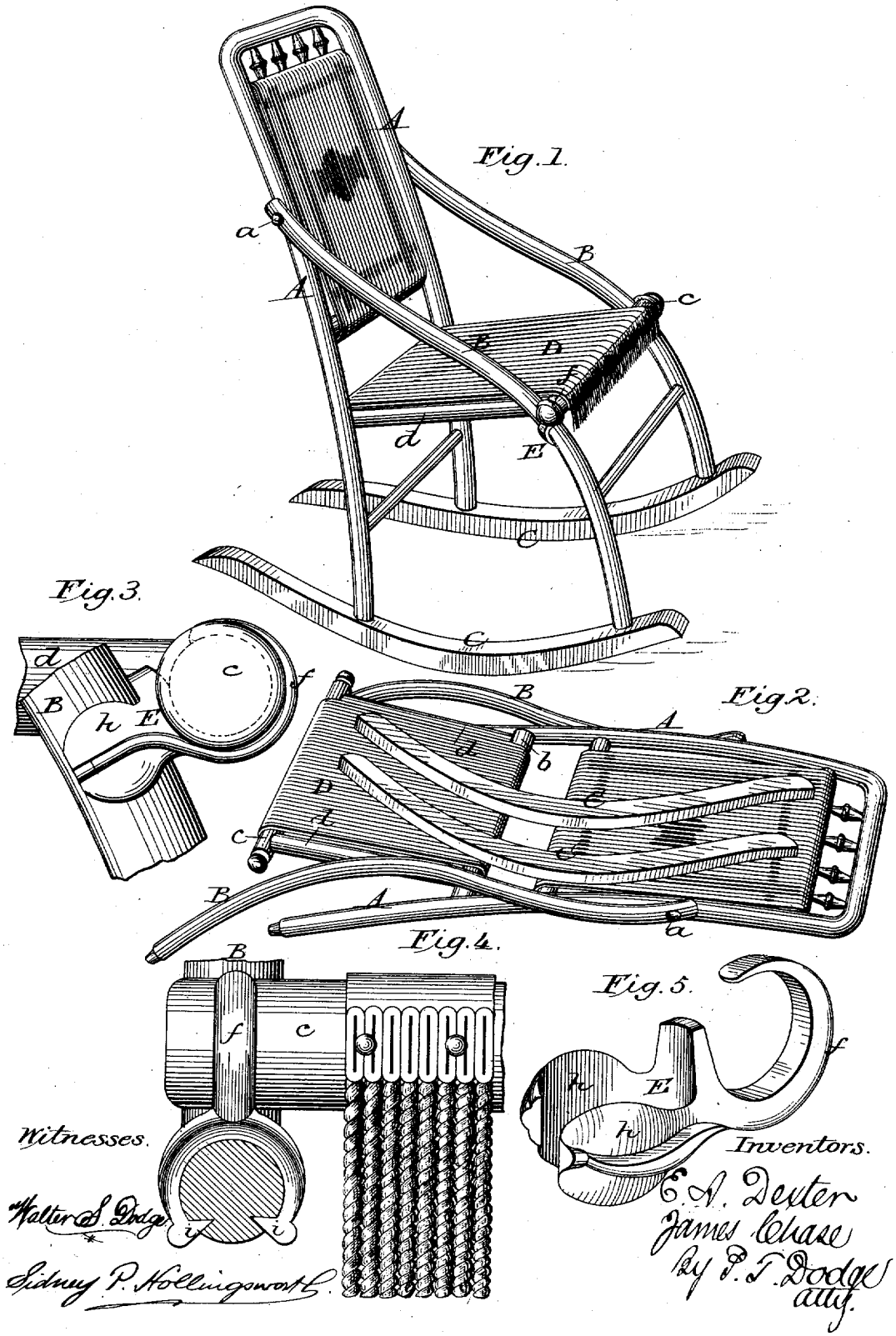
N. PETERS, Photo-Lithographer, Washington, D. C.

UNITED STATES PATENT OFFICE.

EVERETT A. DEXTER, OF BLACK RIVER, AND JAMES CHASE, OF ROCHESTER, NEW YORK.

CHAIR.

SPECIFICATION forming part of Reissued Letters Patent No. 10,754, dated August 10, 1886.

Original No. 227,619, dated May 18, 1880. Application for reissue filed May 13, 1881. Serial No. 33,197.

*To all whom it may concern:*

Be it known that we, EVERETT A. DEXTER, of Black River, in the county of Jefferson, and JAMES CHASE, of Rochester, in the county of Monroe, State of New York, have invented certain new and useful Improvements in Chairs, of which the following is a specification.

Our invention relates more particularly to what are commonly known in the trade as "knockdown" chairs, which are especially designed to be placed in a compact form for transportation and storage.

The first part of the invention relates to the manner of constructing and arranging the parts to give support to the front of the seat; and it consists, essentially, in extending the front cross-bar of the seat beyond the sides of the seat and across the combined arm and leg pieces, curving the combined arm and leg pieces forward in such manner as to stand immediately under and in close proximity to the extended ends of the seat-bar, and uniting the parts thus constructed by means of a rigid connection.

We are aware that it is old to sustain the forward end of a seat-frame by means of upright inclined braces or arms made several inches in length, inserted at the upper end in the seat-frame and at the lower ends in combined arm and leg pieces. This we do not claim. Our structure differs therefrom in that the arm and leg pieces are given a far greater curvature toward the front, and thereby brought immediately under and in close proximity to the extended ends of the front cross-seat bar, and in that we secure a close and rigid connection between the seat-bar and the leg-pieces, the result of this construction being to produce a chair which is lighter in appearance, and which affords greater strength and rigidity against lateral strains.

We are also aware that it has been proposed to make folding chairs with curved combined arms and legs hinged or pivoted at their upper ends to the rear legs, and with the seat connected to said arms and legs by means of a pin projecting from the sides of the front legs and entering recesses cut in the under face of the side pieces of the seat; or by means of pins passed through the front legs and into the ends of the front cross-pieces of the seat; or by a rod passed under the forward part of the seat back from the front cross-piece thereof, with its ends passed across the front legs and secured thereto by pins passed through the ends of the rod into the legs. Our invention differs therefrom, among other particulars, in having the bar which constitutes the front cross-bar of the seat extended beyond the sides of the seat and over and close to the combined arm and leg pieces, and fastenings rigidly securing the extended ends and leg pieces together, whereby the weight is thrown down onto the curve of the leg-pieces, instead of upon pins, as stated, and the connection between the extended front cross-bar of the seat and leg pieces is made strong and rigid without liability of wrenching and loosening the connection between said parts.

The second part of the invention relates to a device for firmly securing the front cross-bar of the seat to the combined arm and leg; and to this end it consists, first, in a double clamping device consisting of a hook or open ring constituting one end of the clamping device, and two curved arms or jaws formed on the opposite end and located at right angles to the hook or open ring, said arms provided at their free ends with spurs or prongs adapted to be embedded in the chair to maintain the clamping device against displacement.

Our invention further consists in the combination, with a combined chair arm and leg and a seat-round, of a clamping device consisting of a hook or open ring which is secured to the seat-round, and two curved arms located at right angles to the hooks or open rings, said arms provided at their free ends with spurs or prongs which are embedded in the opposite sides of the combined arm and leg.

In the accompanying drawings, Figure 1 is a view in perspective of a rocking-chair having our invention embodied therein. Fig. 2 illustrates the chair in its knockdown condition. Fig. 3 is a detailed view in side elevation of the clamping device. Fig. 4 is a detailed view in front elevation of the clamping device, illustrating the combined chair arm and leg in section to show the manner in which the curved arms or jaws are secured in place. Fig. 5 is a view in perspective of the double clamping device.

A A represent two upright substantially parallel legs extending upward to support the back of the chair, as usual.

B B represent the two combined arm and leg pieces attached to the respective legs A by pivots *a* near their upper ends, and curved thence downward and forward in the manner shown, the upper ends curving inward and the lower ends curving out or forward in an arched form, as clearly represented in the drawings.

C C represent two rockers, to which the lower ends of the legs A B are attached, as shown.

D represents the seat of the chair, sustained at its rear edge by the legs A and at its forward end by the combined arm and leg pieces B. This seat consists of carpet or equivalent material attached to a rectangular frame, which frame consists of a rear cross-bar, *b*, a front cross-bar, *c*, constituting the front cross-bar of the seat, and two connecting-bars, *d*, the latter having their ends inserted into and secured firmly within the transverse bars. The rear transverse bar, *b*, has its ends inserted loosely into the legs A, in order to permit the bar to be folded downward when the chair is to be "knocked down," while the front bar, *c*, has its ends extended laterally beyond the seat a sufficient distance to overhang the combined arm and leg B, to give support at the front of the seat.

It will be noted that the combined leg and arm pieces B are curved forward in such position that the projecting ends of the seat-bar *c* stand above and in close proximity thereto, as represented in Fig. 1.

The ends of the bar *c* are secured rigidly to the combined arm and leg pieces.

By curving the pieces B forward, to stand in close proximity to the overhanging ends of the seat-bar, and securing the bar thereto, the chair is rendered exceedingly simple in construction and at the same time given greater strength and durability, the arrangement being such that the chair will resist heavy weights and strong lateral strains without giving away or losing shape, this strength being due mainly to the fact that the straight bar and the elbow-pieces are brought near each other and firmly connected, while the seat-frame ties the front and rear legs firmly together in such manner that the chair-frame may retain its position without the assistance of the rockers. Our construction is also highly advantageous in that it permits the chair to be folded into a flat and exceedingly compact form, as represented in Fig. 2 of the drawings.

E represents the double clamp, consisting of the hook or open ring *f* on one end of the clamp, and with two curved arms or jaws, *h h*, on its opposite end, said jaws being provided on their free ends with the spurs *i i*. The open ring or hook *f* fits into a groove, *k*, formed near the end of the seat-round *c*, and is bent around so as to be snugly seated within said groove, thereby preventing the longitudinal displacement of the seat-round. The curved arms or jaws *h h* are applied to the opposite sides of the combined chair arm and leg, and being pressed toward each other or against the legs the spurs *i i* are embedded in the wood, and thus the clamp is secured in place. The spurs may be formed at any desired point or points on the curved arms or jaws. This double clamp serves to fasten and hold the front round of the seat to the combined arm and leg of the chair in a secure and durable manner, and obviates the employment of bolts, screws, and analogous fastening devices, which necessarily weaken the parts through which they are inserted.

Instead of forming the clamping device so that the open ring or hook may be bent around and fastened to the seat round, it may be constructed to have the open ring or hook fastened to the side round *d*. Again, instead of pivoting the upper end of the combined leg and arm of the chair to the back, as at *a*, such parts may be fastened together by the double clamping-device.

While the drawings represent a rocking-chair merely by way of example to illustrate our improvement, we do not confine ourselves to the employment of our clamping device to any particular style or type of chair, as it may be used on chairs of different forms.

It will be observed that one valuable feature of our improvement consists in the readiness with which the clamping device may be applied to different parts of a chair, as it is simply necessary to bend the open ring or hook around one portion of the chair and the curved arms or jaws around another portion of the chair.

Another advantage resulting from the employment of our improved clamping device is, that the parts secured are held against displacement, as the open ring or hook being bent around snugly within a groove in the cross-round of the seat the latter is retained against any longitudinal displacement.

We are aware that combined arm and leg pieces having a comparatively slight curvature have been connected by long inclined braces with the front of a chair-seat, and this we do not claim. We believe ourselves to be the first to give the combined arm and leg pieces such form that they lie beneath and in close proximity to the extended ends of the seat-bar. It will be seen on referring to our drawings that the seat-bar is connected firmly and securely to and above the arm and leg pieces, and that the two lie close to each other.

Having thus described our invention, what we claim is—

1. In a chair, the combination of the combined arm and leg pieces, curved, substantially as shown, with the seat having the bar which constitutes the front cross-bar of the seat extended beyond the sides of the seat over the combined arm and leg pieces, and adapted to lie close to said pieces, substantially as shown, and be supported by resting thereon, and fastenings rigidly connecting the extended ends to the arm and leg pieces, substantially as described.

2. In a chair, the combination of the rear legs, A, the front arm and leg pieces, B, attached to the legs A and curved forward, as shown, and the seat pivoted at the rear to the rear legs, and having the bar which constitutes the front cross-bar of the seat extended beyond the sides of the seat across the curved legs, and lying close to said legs to adapt it to be supported by the extended ends resting on said legs, substantially as shown.

3. A clamping device for chairs, consisting of a hook or open ring, constituting one end of the device, and two curved arms or jaws formed on its opposite end, said arms or jaws being located at right angles to the open ring or hook, and provided at their free ends with prongs or spurs adapted to be embedded in the chair and retain the clamping device against displacement, substantially as set forth.

4. The combination, with a combined chair arm and leg and a seat-round, of a clamping device consisting of a hook or open ring, which is secured to the seat-round, and two curved arms or jaws located at right angles to the open ring or hook, said arms provided at their free ends with spurs or prongs, which are embedded in the opposite sides of the combined chair arm and leg, substantially as set forth.

EVERETT A. DEXTER.
JAMES CHASE.

Witnesses as to Everett A. Dexter:
J. TAMBLIN,
D. E. DEXTER.

Witnesses as to James Chase:
GEO. B. DICKSON,
T. O. CULBRETH.